United States Patent
Ungan et al.

(10) Patent No.: US 9,985,730 B2
(45) Date of Patent: May 29, 2018

(54) WAKE-UP CIRCUIT IN RECEIVING DEVICE AND METHOD OF OPERATING THE RECEIVING DEVICE

(71) Applicants: Albert-Ludwigs-Universität Freiburg, Freiburg (DE); endiio Engineering GmbH, Freiburg (DE)

(72) Inventors: Tolgay Ungan, Freiburg (DE); Leonhard Reindl, Kirchzarten (DE); Thomas Ostertag, Geretsried (DE); Ulrich Gamm, Freiburg (DE)

(73) Assignees: Albert-Ludwigs-Universität Freiburg, Freiburg (DE); endiio Engineering GmbH, Freiburg (DE)

( * ) Notice: Subject to any disclaimer, the term of this patent is extended or adjusted under 35 U.S.C. 154(b) by 0 days. days.

(21) Appl. No.: 15/073,049

(22) Filed: Mar. 17, 2016

(65) Prior Publication Data
US 2016/0277128 A1  Sep. 22, 2016

(30) Foreign Application Priority Data
Mar. 19, 2015  (DE) .......... 10 2015 104 141

(51) Int. Cl.
*H04B 1/38* (2015.01)
*H04B 15/00* (2006.01)
(Continued)

(52) U.S. Cl.
CPC ......... *H04B 15/005* (2013.01); *H04B 1/3805* (2013.01); *H04L 1/0036* (2013.01);
(Continued)

(58) Field of Classification Search
CPC ... H04B 1/10; H04B 1/16; H04B 1/38; H04B 1/3805
See application file for complete search history.

(56) References Cited

U.S. PATENT DOCUMENTS 7,142,838 B2   11/2006  Rotzoll
8,472,507 B2 *  6/2013  Sharma ............ H04W 52/0229
                                                375/219
(Continued)

FOREIGN PATENT DOCUMENTS

DE  102010020733 A1  11/2011
EP      2572539 B1   4/2014
(Continued)

OTHER PUBLICATIONS

Austriamicrosystems AG, Data Sheet, "AS3933 3D Low Frequency Wakeup Receiver," Copyrights 1997-2010, 43 pages, www.austriamicrosystems.com/LF-Receive/AS3933, Unterpremstaetten, Austria.

*Primary Examiner* — Blane Jackson
(74) *Attorney, Agent, or Firm* — Slater Matsil, LLP (57) ABSTRACT

A receiving device and a method for operating a receiving device are provided in which a signal is divided into two separate signal parts. The two signal parts are demodulated simultaneously and, from the demodulated signals, the difference is formed. After the formation of the difference, an information item is obtained from the difference signal and compared with a predetermined information item. In the case of correspondence of the obtained information and the compared information, a wake-up signal is generated.

20 Claims, 5 Drawing Sheets

(51) Int. Cl.
 *H04B 1/3805* (2015.01)
 *H04W 52/02* (2009.01)
 *H04L 1/00* (2006.01)

(52) U.S. Cl.
 CPC ..... *H04W 52/028* (2013.01); *H04W 52/0229* (2013.01); *Y02B 60/50* (2013.01)

(56) References Cited

U.S. PATENT DOCUMENTS

| | | | |
|---|---|---|---|
| 8,606,215 B2 * | 12/2013 | Sharma | H04B 1/1638 455/296 |
| 2005/0020321 A1 | 1/2005 | Rotzoll | |
| 2009/0110035 A1 | 4/2009 | Sutton et al. | |
| 2009/0135886 A1 | 5/2009 | Robertson et al. | |
| 2009/0252042 A1 | 10/2009 | Bradley et al. | |
| 2010/0040120 A1 | 2/2010 | Sharma | |
| 2012/0171978 A1 | 7/2012 | Sharma et al. | |
| 2013/0130636 A1 | 5/2013 | Ungan et al. | |
| 2015/0071151 A1 | 3/2015 | Bradley et al. | |

FOREIGN PATENT DOCUMENTS

| | | |
|---|---|---|
| WO | 2009044365 A2 | 4/2009 |
| WO | 2010006221 A2 | 1/2010 |

\* cited by examiner

WAKE-UP CIRCUIT IN RECEIVING DEVICE AND METHOD OF OPERATING THE RECEIVING DEVICE

This patent application claims the priority of German patent application 10 2015 104 141.3, filed Mar. 19, 2015, which is incorporated herein by reference in its entirety.

TECHNICAL FIELD

The present invention relates to a receiving device and method for operating a receiving device.

BACKGROUND

To lower the energy consumption is a major problem in the field of development of electrical devices these days. Many devices are operated uninterruptedly for comfort reasons but also from the necessity of an associated operating reliability. This means that these devices are not switched on only when they are needed but are in operation uninterruptedly. This is necessary particularly if the device is a wireless receiving device in the case of which it is not predictable when it should receive an information item or an information item is sent out for reception.

Applications for this purpose are, for example, devices which are used for monitoring sensors which, when an event occurs, transmit the presence of this event and/or also associated additional information. The necessity for saving energy is given particularly when the wireless receiving device itself is not connected to a voltage supply system. In such a case, battery operation or similar autonomous power supplies are used, as a rule. To operate such devices, it is, therefore, now normal usage to place them into a so-called rest state in that parts of the device are switched off for reducing the energy consumption and are "woken up", i.e., reactivated, as soon as the device is needed.

In this respect, a device with mode of operation switch is known, for example, from EP2572539 B1, also published as U.S. Patent Publication No. 2013/0130636 A1. This has a detector circuit which is configured for minimum energy consumption and monitors the presence of a predetermined radio-frequency signal. In detail, this means that when a predetermined information item such as, for example, an address, is transmitted at a particular frequency, the detector circuit forwards a wake-up signal to a microcontroller which thereupon changes into its normal operating state. The "woken" microcontroller thereupon controls the further waking up of the electronic device. In the method described in EP2572539B1, the address to be detected by the detector is impressed on a 125 kHz signal by means of OOK modulation (On-Off modulation) and with this an 868 MHz carrier signal is modulated.

In principle, the device described operates satisfactorily, but has the disadvantage that it is sensitive to interference signals. This means that the spacing between useful signal and interference signal is reduced with increasing distance between transmitter and receiver.

SUMMARY

A receiving device is provided which has a signal interface, a power supply interface and a processing device. The receiving device can be connected here via the power supply interface to a power source and it is supplied with signals via the signal interface. In this context, the signals are supplied via a first signal path to a differential demodulation device. In the latter, the signal is resolved into at least two components, demodulated and the difference of the two demodulation signals is formed. This difference signal is supplied to a decoding device which decodes the difference signal, obtains an information item and compares it with a predetermined information item and, in the case of correspondence of the information obtained and the predetermined information, supplies a wake-up signal to the processing device via a wake-up path. In this context, the receiving device is designed in such a manner that, when receiving the wake-up signal via the wake-up connection, it changes from an energy-saving rest mode of operation into an active mode of operation.

In the rest mode of operation, at least the processing device advantageously exhibits a restricted functionality and reduced energy consumption compared with the active mode of operation as a result of which the total energy consumption of the receiving device is reduced with little expenditure.

Advantageously, the processing device is connected to the signal interface via a second signal path. This enables a transceiver device to be provided in the second signal path which forwards information received in the active mode of operation of the processing device, after a demodulation, to the processing device and via which information to be sent out by the processing device is converted by means of modulation into a transmitted signal in order to send out the latter via the signal interface.

In an advantageous embodiment, the signal interface is connected via a switching device either to the first or to the second signal path. For controlling the switching device, the processing device is connected to the switching device via a control line. In this manner, the processing device can control the switching device in such a manner that, when the processing device is in rest mode, the switching device connects the signal interface to the first signal path.

If the processing device is in active mode of operation, the switching device is driven by the processing device in such a manner that the switching device connects the signal interface to the second signal path. This has the advantage that only either the first signal path or the second signal path is connected to the signal interface which facilitates the matching of the rectifying differential circuit and the transceiver circuit to an antenna device connected to the radio-frequency signal interface when the signal is a radio-frequency signal. In this context, the interface is advantageously connected to an antenna device via an antenna line.

In addition, switching to the first or to the second signal path has the effect that, without input signal, the transceiver unit spontaneously consumes less current.

Since the second signal path is configured to be bidirectional, it is also possible that the processing device of the transceiver device transmits via this path not only information for sending out but also a command so that the transceiver device places itself into a rest mode or is controlled into an active mode of operation from the rest mode.

Alternatively, an additional signal path can be provided for this which simplifies the control of the transceiver unit.

In an advantageous embodiment, the rectifying differential circuit has two parallel-connected filter stages which divide the radio-frequency signal supplied via the radio-frequency signal interface into two frequency ranges which are demodulated by means of a respective rectifying device. The demodulated signals of the two rectifying devices are supplied to a differential stage which generates a difference signal of the two demodulated signals. This has the advantage that due to forming the difference, interference signals which are superimposed on the radio-frequency signal supplied are contained in both demodulated signals so that the interference signals are eliminated by forming the difference.

The device and the method for operating this device are advantageously suitable for any type of signals up to sound signals, particularly ultrasonic signals.

BRIEF DESCRIPTION OF THE DRAWINGS

In the text which follows, the invention will be explained in greater detail by means of exemplary embodiments, with reference to the description of the figures, in which:

FIGS. 3A-3C, collectively FIG. 3, show a parallel representation of the signals in the time plane;

DETAILED DESCRIPTION OF ILLUSTRATIVE EMBODIMENTS

Figure 1:
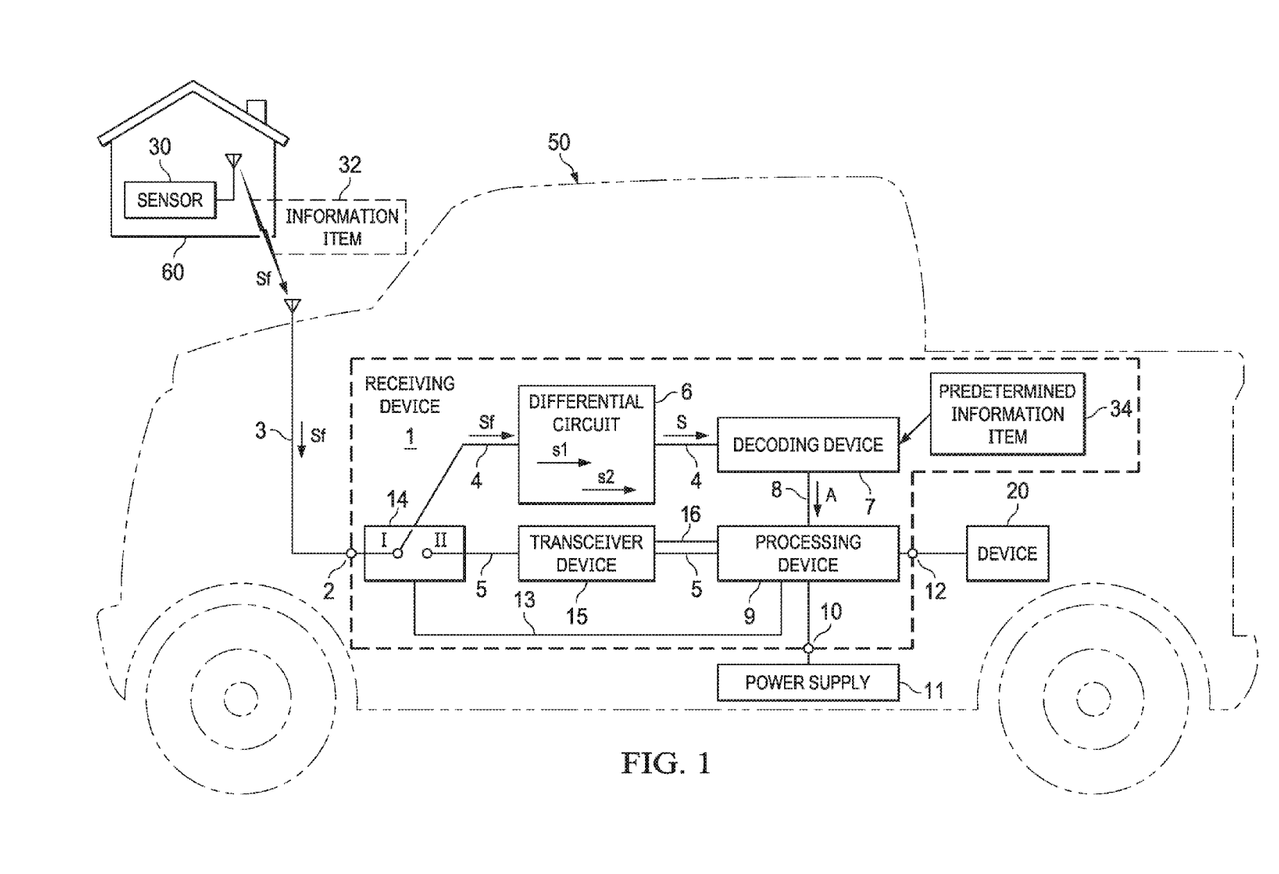
FIG. 1 shows a diagrammatic representation of a first exemplary embodiment of a receiving device.

FIG. 1 shows a block diagram of a receiving device 1. The latter has a radio-frequency signal interface 2, a power supply interface 10 and a function interface 12. Via the power supply interface 10, the receiving device 1 is supplied with the necessary power from a power supply 11. In this context, the power supply 11 can be supplied with the power via a system voltage connection but also via a battery, accumulator and/or a generative power supply such as solar cells or electromechanical energy transducers or combinations of these. An example of a configuration of a power supply 11 is provided in FIG. 5 and further described below, with respect to FIG. 5.

Via the radio-frequency signal interface 2, the receiving device 1 is supplied with a radio-frequency signal Sf carrying information item 32 from sensor 30, with Sf being transmitted wirelessly by sensor 30, which is received via an antenna 3 matching the frequency range of the radio-frequency signal. The antenna 3 is here connected to the radio-frequency signal interface 2 directly or via a suitable antenna line. The antenna line is not shown in FIG. 1, neither are matching elements normally used in radio-frequency technology for matching the radio antenna, for example, to the antenna line or the input or output impedance of the radio-frequency signal interface.

The function interface 12 has the purpose of allowing the receiving device 1 to communicate with other devices, e.g. device 20 connected to the receiving device 1 in vehicle 50. In this context, it is provided at least that a processing device 9 provided in the receiving device 1 supplies information to device 20 connected to the receiving device 1 via the function interface 12. The information may originate for example, in sensor 30 in home 60, and be transmitted wirelessly to the receiving device 1. However, it is also possible that the function interface 12 is designed to be bidirectional in order to supply signals to the processing device 9, for example, when the processing device 9 consists of a programmable microcontroller, in order to program the latter.

The radio-frequency signal interface 2 is also connected to a signal path switching device 14 which has at least two switch positions I and II. To the first switch position I, a first signal path is connected and to the second switch position II, a second signal path 5 is connected. The signal path switching device 14 is connected via a control connection 13 to the processing device 9 which controls the signal path switching device 14 in such a manner that at least the radio-frequency interface 2 is connected either to the first signal path 4 or to the second signal path 5. In this context, the processing device 9 is designed in such a manner that it has at least two modes of operations, namely either an active mode of operation or a rest mode of operation. In the active mode of operation, the processing device 9 controls the signal path switching device 14 in such a manner that the radio-frequency signal interface 2 is connected to the second signal path 5. In the rest mode of operation, the functionality of the processing device 9 is reduced to such an extent that the processing device 9 is only able to respond to a wake-up signal A supplied via a wake-up line 8 and to change the receiving device 1 into the active mode of operation. If the processing device 9 changes into the rest mode of operation, it first controls the signal path switching device 14 via the control connection 13 in such a manner that the radio-frequency signal interface 2 is connected to the first signal path 4. In this context, the invention is not restricted to the processing device 9 being able to assume exclusively a rest mode of operation and an active mode of operation. However, these can be subsumed at least under the active mode of operation.

The first signal path 4 is designed in such a manner that, when the rest mode of operation of the processing device 9 is present, a received radio-frequency signal Sf with information item 32 from wireless sensor 30 is initially supplied to a rectifying differential circuit 6. The information item 32 can include an address of wireless sensor 30, as indicated in the background, identifying whether the wireless sensor 30 is to be monitored by receiving device 1 (also as further described below with respect to examples of the multiplicity of applications in which to use the wake-up process for the recveicing devive 1). The latter will be explained in greater detail as an embodiment in the further description, referring to FIG. 2. Firstly, it is assumed that a demodulated difference signal S which is largely free of interference is then supplied to a decoding device 7 which converts the demodulated signal S into an information item 32 and thereupon checks whether a predetermined information item 34 has been transmitted. The decoding device will also be explained in detail subsequently, referring to FIG. 2.

It is initially found that when an information item 32 matching a predetermined information item 34, is present which is supplied via the first signal path 4, the decoding device 7 supplies a signal acting as wake-up signal A via a wake-up line 8 to the processing device 9. Thus, the wake-up function of the receiving device 1 is firstly explained once in principle.

If the processing device 9 has woken up, the processing device 9 as already explained before controls the signal path switching device 14 in such a manner that the radio-frequency signal interface, in switch position II, is connected to the second signal path in which a transceiver device is then interposed between the processing device 9 and the signal path switching device 14. Such a transceiver device 15 will not be explained in greater detail in the text which follows. It is only pointed out that the latter is designed for receiving and sending out radio-frequency signals via the radio-frequency signal interface 2 and supplies to the processing device 9 connected to the transceiver device information items which have been transmitted via the received radio-frequency signal and are edited in such a manner that the processing device 9 can process this information. Similarly, the transceiver device 15 is designed to convert any information supplied to it from the processing device 9 into a suitable radio-frequency signal so that it can be sent out via the radio-frequency signal interface 2 by means of the connected antenna 3.

Additionally, the possibility is pointed out that the first and the second signal path 4 and 5 can also be connected directly passively to the radio-frequency signal interface without signal path switching device 14.

However, the function interface 12 can also be omitted if it involves devices such as, for example, so-called "long range ident marks". These can thus be changed in a simple manner from a rest mode of operation into the active mode of operation.

In an exemplary embodiment, not shown, the processing device 9 can be connected additionally by means of a supplementary control line 16 to the transceiver device 15 in order to control the transceiver device 15 actively into a rest mode of operation before it changes itself into the rest mode of operation and, after a transition from the rest mode of operation into the active mode of operation also places the transceiver device 15 into a corresponding active mode of operation.

Figure 2:
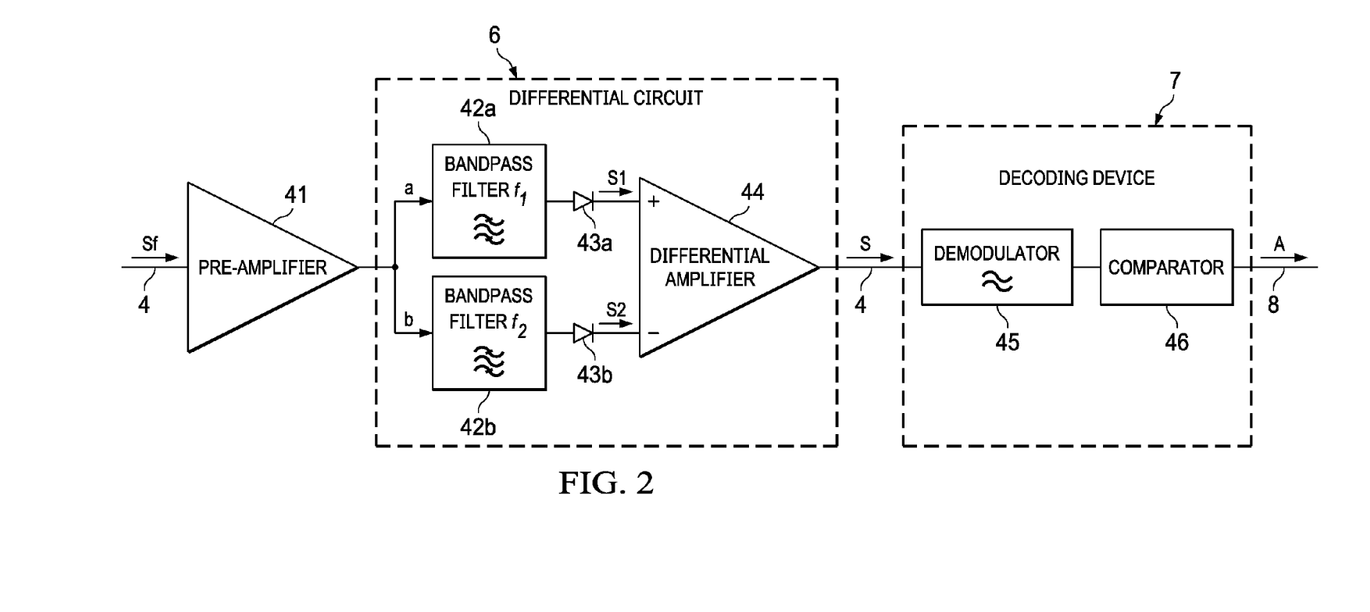
FIG. 2 shows a first exemplary embodiment of the first signal path.

FIG. 2 shows the first signal path 4. In the latter, a preamplifier 41 is first provided optionally. Whether the latter is used or not depends not only on the availability of the power for operating the preamplifier 41 but also on the field of application, i.e. ultimately on the length of the transmission link for the radio-frequency signal supplied and on the typical interference signals in the environment. Following behind the preamplifier 41, the signal path 4 branches into two parallel part-paths a and b. These are differentiated in that in each case one filter 42a and 42b, respectively, is provided which passes at different frequency ranges in the same frequency band on this signal path. For these filters 42a and 42b on the part-paths a and b it holds true, so that they meet the described functionality of a frequency diplexer, that they do not have any overlapping frequency range. It is only thus that it can be ensured that the respective other corresponding signal is not allowed to pass which would lead to a weakening of the useful signal.

In this way, two signals which are received simultaneously in one frequency band are divided into the two part-paths a and b by means of the two different filters 42a and 42b. An example of this is when two signals of, for example, a: F1=863 MHz and b: F2=873 MHz are transmitted simultaneously in the UHF band, they are thus divided into the two part-paths a and b shown for F1 and F2 according to FIG. 2.

Following the filter, a diode such as, for example, a Schottky diode 43a and 43b is in each case provided, the cathodes of which are connected in each case to the positive or negative terminal of a differential amplifier 44 and which operate as detector.

Apart from the series circuit of the diodes as detector shown, a circuit arrangement as a so-called shunt detector can also be implemented on equal terms. Similarly, the polarity is unimportant, a negative detector voltage can also be used even though these circuit examples are not shown in the figures.

These two signals are designated by s1 and s2. The difference signal s applied at the output of the differential amplifier 44 is thus s=s1−s2. This difference signal s is subsequently supplied to a demodulator 45 and thereafter to a comparator 46. The demodulator 45 should be designed as bandpass filter in the present exemplary embodiment. Passive bandpass filters are particularly suitable for this, e.g., by using a tuning fork crystal since this does not need any additional power supply. The signal thus obtained is supplied to the comparator 46 which compares the signal or the associated information item 32, respectively, with a predetermined information item 34, and in the case of correspondence outputs a signal A at the end to the processing device 9. This is the wake-up signal A already explained before with reference to FIG. 1, which is supplied to the processing device 9 via the wake-up line 8. As a special embodiment, the decoder device 7 can be designed in such a manner that the comparator 46 is only activated when a modulation is detected.

In comparison with FIG. 1, filters 42a, 42b, diodes 43a and 43b and the differential amplifier 44 thus represent the rectifying differential circuit 6 and filter 45 and comparator 46 represent the decoding device 7.

Figure 3A:
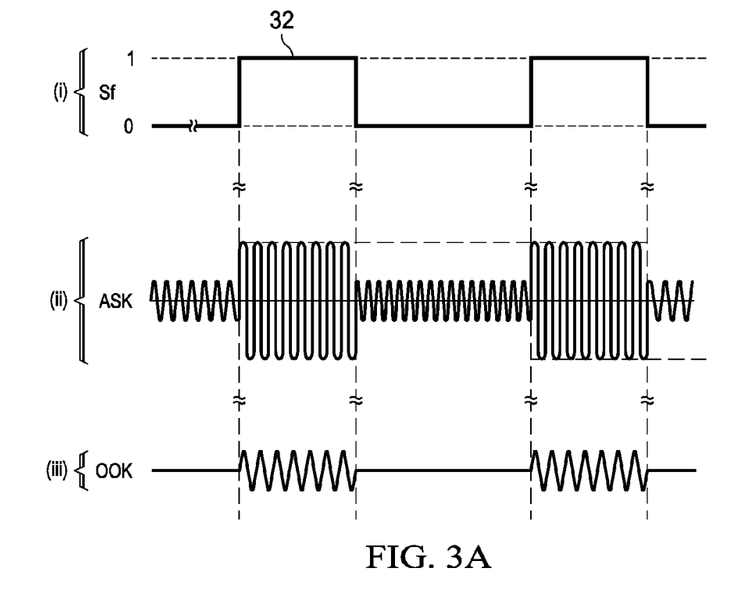

In the text which follows, the operation is explained in greater detail with reference to FIG. 3, which includes FIGS. 3A-3C. In FIG. 3A, a signal (i) is shown which alters between the 0 and 1 states. For the transmission of such digital information, e.g., the modulation according to the so-called amplitude shift keying (ASK), as shown at (ii) or the so-called on-off keying (OOK) as shown at (iii) have been found to be suitable. In the final analysis, the OOK process is a special form of the ASK process in which the amplitude of a signal changes with the jump from one logical state into the other state. In this respect, it can be seen at ii that the amplitude has a lower value at a logical state 0 than at the logical state 1. By comparison, the amplitude=0 at the logical value of 0 according to the OOK process as shown at (iii), and ≠0 at the logical value of 1. The relevant difference between ASK and OOK here is that a value not equal to zero is assumed in both states in the case of ASK, and in the case of OOK, a state at zero which represents the value of 0 or 1 depends on the convention alone in this case.

Figure 3B:
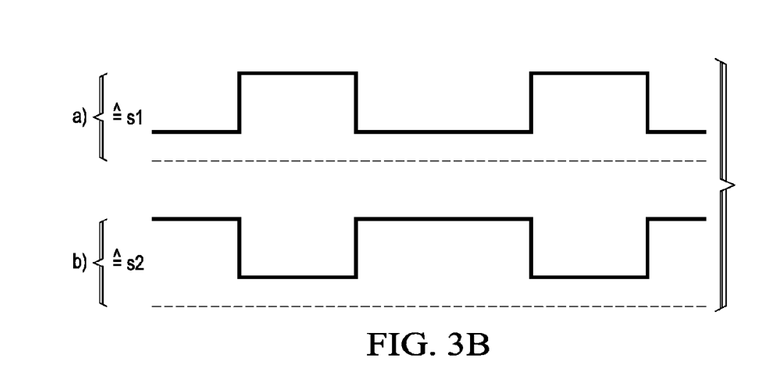

In FIG. 3B, two signals a), b) are shown which, as mentioned before, were transmitted simultaneously ASK-modulated in the UHF band with f1=863 MHz and f2=873 MHz, and demodulated again. In this context, it must be noted, however, that the two signals a), b) are modulated precisely mirror-inverted. This means that a) assumes the high amplitude value at the logical state 1 and b) assumes the low amplitude value.

For the operation of the present wake-up circuit, a signal Sf is thus generated in which the information item 32 which causes the waking up is modulated onto two different frequencies f1 and f2 according to the ASK method with mirror-inverted logic. If such a signal Sf is supplied via the radio-frequency signal interface 2 in FIG. 1 to the first signal path 4, it can be seen according to FIG. 2 in FIG. 3B in a) and b) that the two signals modulated in accordance with opposite logic are demodulated separately by the two filters 42a and 42b and supplied as signals s1 and s2 to the differential amplifier 44 for forming the difference.

Figure 3C:
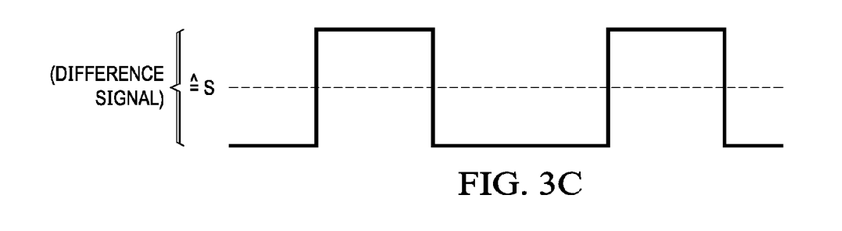

In FIG. 3C, the difference signal s, resulting from forming the difference, of the differential amplifier 44 can be seen. This in turn corresponds to the signal variation, shown in FIG. 3A in (i), with its jumping between the logical states of 0 and 1. It can be seen easily that using the OOK process also leads to the same result. As already mentioned initially, interference signals which are mandatorily present equally on both signals by using the same transmission path are eliminated by forming the difference as already mentioned initially. This difference signal s is supplied to the bandpass filter 45 which is tuned to the transmission rate of the information to be transmitted, and thus a signal to be processed is obtained which, as already mentioned previously with respect to FIG. 2, is supplied to the comparator 46.

Figure 4:
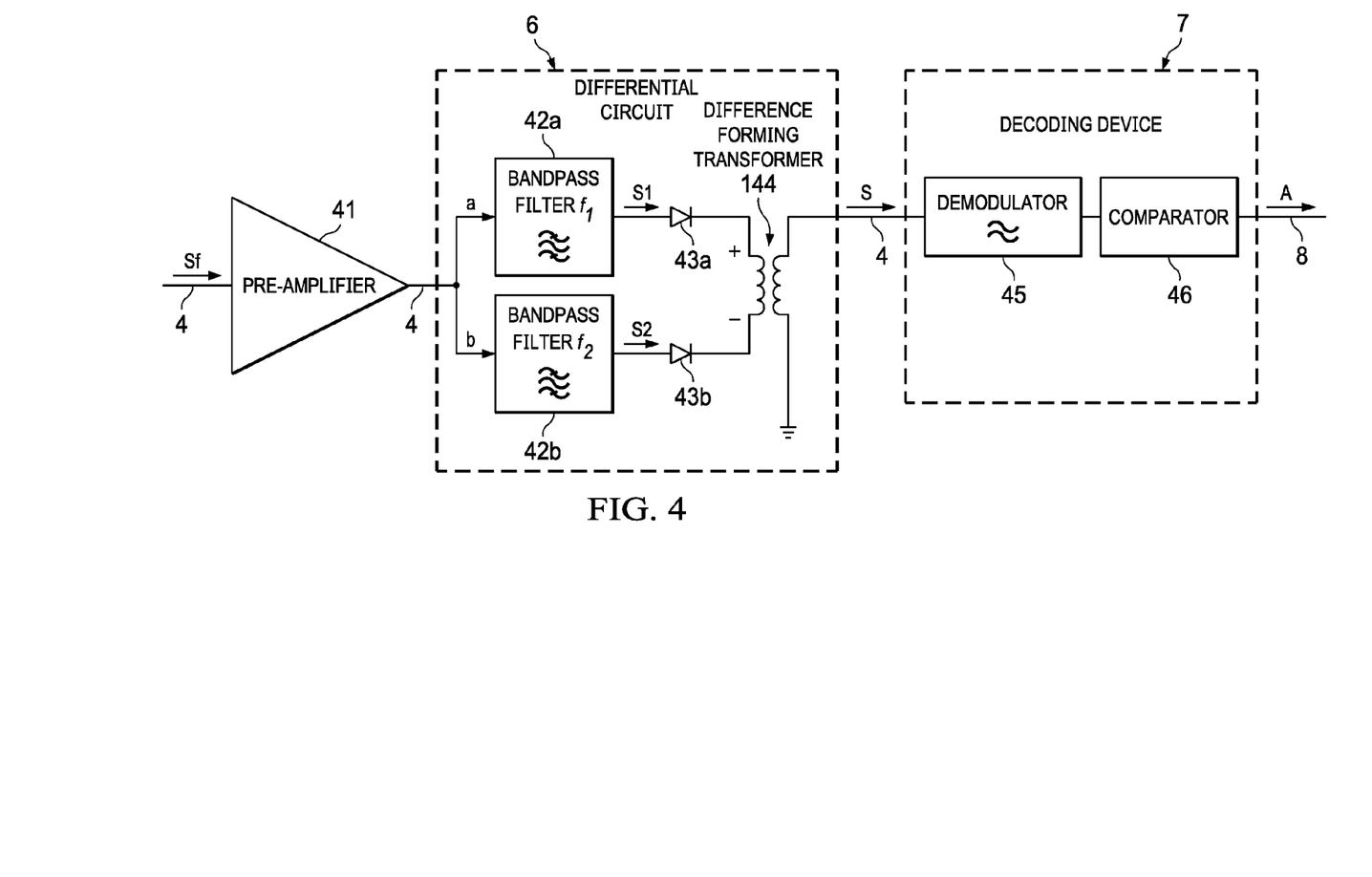
FIG. 4 shows an alternative embodiment of the first signal path.

FIG. 4 shows an alternative embodiment of the first signal path 4 in which, instead of the differential amplifier, a passive component, namely a difference-forming transformer 144 is now used. This has two difference-forming coil inputs which are symbolized by "+" and "−" and a galvanically separated coil output at which the difference signal s, comparably to the output signal of the differential amplifier 44 in FIG. 2, is output. The advantage of such an arrangement is that the difference is formed without additional power supply. In addition, identical elements to those in FIG. 2 are used according to FIG. 4 so that this arrangement is functionally equal compared with FIG. 2. If the potential isolation in the first signal path 4 is omitted, the difference-forming transformer can be designed as a so-called autotransformer. The essential advantage of the exemplary embodiment with a difference-forming transformer is that, apart from the signal, no power needs to be supplied for forming the difference.

Figure 5:
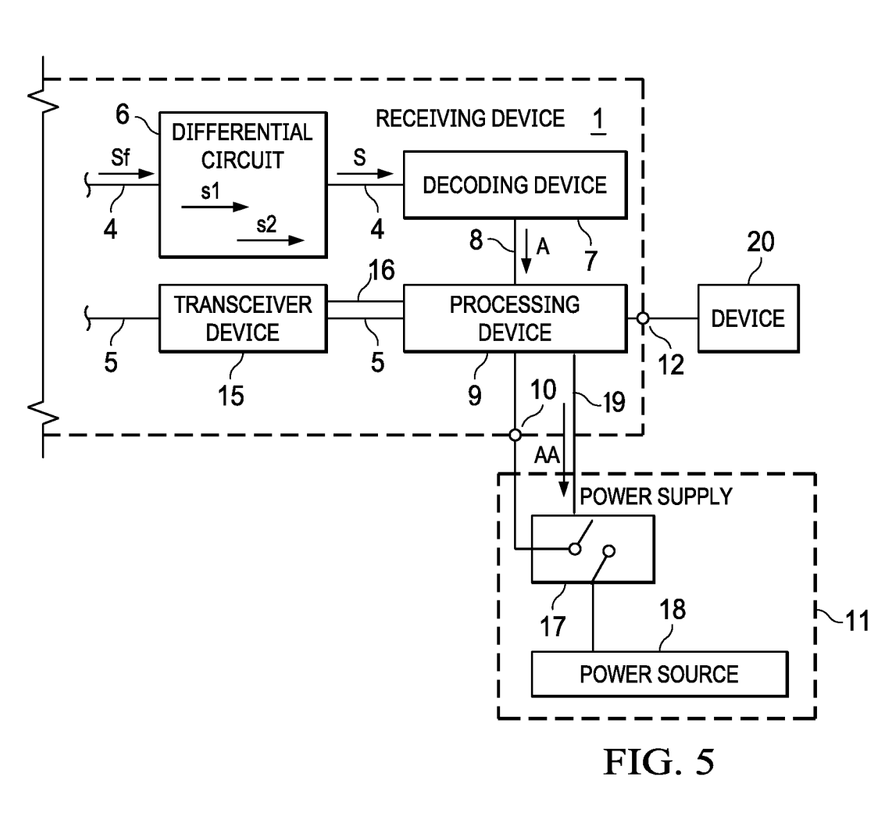
FIG. 5 shows a diagrammatic representation of a second exemplary embodiment of a receiving device.

FIG. 5 shows a second exemplary embodiment of a power supply 11 that interfaces with the processing device 9 in the receiving device 1. The receiving device 1 has a signal interface 2 which is supplied line-connected with a signal. The processing device 9 receives wake-up signal A. The processing device 9 supplies wake-up control signal AA via control line 19 to a power supply switching device 17 which is designed in such a manner that after wake-up control signal AA has been supplied, a previously open connection to a power source 18 is closed. In this context, the rectifying differential circuit 6 and the decoding device 7 are configured as described with reference to FIG. 2.

The explanations mentioned previously relate to the exemplary embodiments shown in the figures. As a further alternative embodiment, it is pointed out here with reference to FIG. 2 that the frequency diplexer can be implemented by means of a division into different frequency bands and also by means of the filters 42a and 42b. For this purpose, the two signals must be transmitted in different frequency bands. If the signal interface is connected to an antenna 3, this must therefore also be designed in a manner suited for both frequency bands.

Furthermore, it is naturally also possible to perform the forming of the difference via more than two signals in more than two different frequency ranges.

The receiving device 1 previously explained with reference to the exemplary embodiment can be used in a multiplicity of applications. Thus, e.g., in the monitoring of sensors, particularly battery-operated sensors if these are probed only rarely. A further example is the remote detection of counter readings of water meters, gas meters, etc. Thus, for example, the customers can be passed street by street, for example in a vehicle 50 that passes houses, such as house 60, as shown in FIG. 1, and, in traveling past, the counters can be "woken up" and polled. Furthermore, there are applications in the long-term monitoring of batteries. This prevents the batteries from being discharged more by the monitoring measure than by the application for which the battery is intended. Sensor 30 in FIG. 1 refers to any one or more of the above-described meters or other sensors. As a further example of the wake-up process described above with reference to FIG.1, a gas meter transmits information item 32 in signal Sf, such as the address of the gas meter. Receiving device 1 is in rest mode, and the information item 32 in signal Sf is sent along first signal path 4. Differential circuit 6 reduces interference, and provides a differential signal s to decoding device, with the gas meter address. Decoding device 7 determines when the information item 32 that is a gas meter address, matches a predetermined information item 34, such as a known address of a gas meter that should be remotely monitored. When there is a match, decoding device 7 sends a wake-up signal A to processing device 9, and processing device 9 controls switching device 14 to switch from first signal path 4 to second signal path 5. Processing device 9 supplies wake-up signal A to power supply 11, that connects power source 15 with load 16, to continue operation in an active or awake state. Once in an active state, information received wirelessly from sensor 30 into receiving device 1 is carried in signals transmitted along second signal path 5. Second signal path 5 permits information originating from wireless sensor 30 to be carried through function interface 12 to device 20, for example for processing, e.g., monitoring the readings at the gas meter in wireless sensor 30 at the house 60, as a further example of function interface 12 described above. In this way, signal interference is reduced, battery consumption is reduced, making receiving device 1 able to increase the efficiency of monitoring gas consumption by various houses on a street. The operator can monitor a variety of houses quickly and efficiently, without stopping, parking the car at each house, walking up to each house to manually read and record the gas consumption.

Finally, applications for so-called consumer products are provided which are operated increasingly wirelessly, such as, for example, loudspeakers, computer mice and the like so that these can be placed into an effectively energy-saving rest mode of operation and reliably again into the active mode of operation.

The invention claimed is:

1. A receiving device comprising:
   a signal interface;
   a supply interface; and
   a first signal path which is connected to the signal interface;
   wherein the first signal path has a rectifying differential device and a decoding device that is connected to a processing device via a wake-up path;
   wherein the rectifying differential device is designed in such a manner that a signal supplied via the signal interface is divided into a plurality of different frequency signal parts that are demodulated, a difference of two demodulated signals is formed to determine a difference signal that is supplied to the decoding device;
   wherein the decoding device is designed in such a manner that it obtains an information item from the difference signal, compares the information item with a predetermined information item and, in a case of correspondence between the information item and the predetermined information item, the decoding device supplies a wake-up signal to the processing device via a wake-up path; and
   wherein the receiving device is designed in such a manner that the receiving device can be operated in an active mode of operation and a rest mode of operation and, when receiving the wake-up signal, changes from the rest mode of operation into the active mode of operation.

2. The receiving device according to claim 1, wherein the processing device is configured, in the rest mode of operation, to exhibit a restricted functionality and reduced energy consumption compared with the active mode of operation.

3. The receiving device according to claim 1, further comprising a second signal path and a transceiver device;
wherein the second signal path is designed in such a manner that the transceiver device is connected to the processing device and to the signal interface; and
wherein the transceiver device is designed in such a manner that it demodulates a signal supplied via the signal interface and supplies information contained therein to the processing device so that the processing device can process the supplied information in the active mode of operation.

4. The receiving device according to claim 3, wherein the transceiver device is connected to the processing device and is designed in such a manner that it can receive a signal from the processing device either via the second signal path or via an additional second control connection so that the transceiver device can alternate between an active mode of operation and a rest mode of operation at the same time as the processing device.

5. The receiving device according to claim 3, wherein the transceiver device is designed in such a manner that it converts information supplied by the processing device via the second signal path into a signal to be sent out of the second signal path via the signal interface.

6. The receiving device according to claim 3, further comprising a switching device that connects the signal interface to the first signal path in a first switch position and to the second signal path in a second switch position.

7. The receiving device according to claim 6, wherein the switching device is connected to the processing device via a control connection via which the processing device supplies control signals to the switching device in the active mode of operation.

8. The receiving device according to claim 6, wherein the switching device is designed in such a manner that it independently assumes the first switch position after a predetermined time interval in a case of a cessation of a control signal.

9. The receiving device according to claim 1, further comprising a power source connected to the supply interface.

10. The receiving device according to claim 1, wherein the rectifying differential device has two parallel-connected filter stages configured to divide the supplied signal into two frequency ranges and has two diodes that are configured to demodulate each of the two frequency ranges into a respective signal and to supply a respective demodulated signal to a positive or a negative input of a differential amplifier.

11. The receiving device according to claim 1, further comprising a function interface configured to provide an exchange of information between the processing device and a device connected to the receiving device.

12. The receiving device according to claim 11, wherein the processing device is designed in such a manner that it can send a control signal to the device connected to the receiving device, wherein the control signal indicates to the device whether the device should switch between a rest mode of operation and an active mode of operation.

13. The receiving device according to claim 1, wherein the receiving device is configured to receive or transmit a radio-frequency signals and wherein the signal interface is designed as a radio-frequency signal interface.

14. The receiving device according to claim 13, further comprising an antenna device, wherein the radio-frequency signal interface is connected to the antenna device directly or via a radio-frequency line.

15. The receiving device according to claim 1, wherein the receiving device is configured to receive or transmit a sound signal and wherein the signal interface comprises a sound signal interface.

16. The receiving device according to claim 1, wherein the signal is supplied from a remote sensor that transmits the information item wirelessly to the receiving device, the information item is an address of the remote sensor, and the predetermined information item is an address of one of a plurality of remote sensors that are predetermined in the receiving device to initiate the changes of the receiving device into the active mode of operation.

17. A method for operating a receiving device, the method comprising:
dividing a signal into a plurality of separate signal parts;
simultaneously demodulating two signal parts;
forming a difference signal based on a difference between the demodulated signal parts;
after forming the difference signal, obtaining an information item;
comparing the information item with a predetermined information item; and
generating a wake-up signal if there is a correspondence of the obtained information item and the predetermined information item and not generating the wake-up signal if there not is a correspondence of the obtained information item and the predetermined information item.

18. The method according to claim 17, wherein the two signal parts are formed by mirror-inverted on-off coding or by amplitude shift coding.

19. The method according to claim 17, wherein comparing the information item is activated only after a demodulated information item has been recognized.

20. A receiving device comprising:
means for dividing a signal into a plurality of separate signal parts;
means for simultaneously demodulating two signal parts and forming a difference signal from the demodulated signal pails; and
means for obtaining an information item after forming the difference signal, comparing the information item with a predetermined information item, and generating a wake-up signal where there is a correspondence of the obtained information item and the predetermined information item.

* * * * *

UNITED STATES PATENT AND TRADEMARK OFFICE
CERTIFICATE OF CORRECTION

PATENT NO. : 9,985,730 B2  
APPLICATION NO. : 15/073049  
DATED : May 29, 2018  
INVENTOR(S) : Tolgay Ungan et al.

Page 1 of 1

It is certified that error appears in the above-identified patent and that said Letters Patent is hereby corrected as shown below:

In Column 10, Line 50, Claim 20, delete "signal pails" and insert --signal parts--.

Signed and Sealed this  
Seventh Day of August, 2018

Andrei Iancu  
*Director of the United States Patent and Trademark Office*